(12) United States Patent
Shen et al.

(10) Patent No.: US 11,863,461 B2
(45) Date of Patent: Jan. 2, 2024

(54) DATA PROCESSING METHOD, DATA PROCESSING APPARATUS, ELECTRONIC DEVICE, STORAGE MEDIUM, AND PROGRAM PRODUCT

(71) Applicant: LYNXI TECHNOLOGIES CO., LTD., Beijing (CN)

(72) Inventors: Yangshu Shen, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 24 days.

(21) Appl. No.: 17/778,929

(22) PCT Filed: Dec. 9, 2020

(86) PCT No.: PCT/CN2020/134921
§ 371 (c)(1),
(2) Date: May 23, 2022

(87) PCT Pub. No.: WO2021/115326
PCT Pub. Date: Jun. 17, 2021

(65) Prior Publication Data
US 2022/0417169 A1   Dec. 29, 2022

(30) Foreign Application Priority Data

Dec. 9, 2019   (CN) ......................... 201911252455.1
Dec. 9, 2019   (CN) ......................... 201911252471.0

(51) Int. Cl.
*H04L 47/6275*   (2022.01)
*H04L 49/109*    (2022.01)
*H04L 47/62*     (2022.01)

(52) U.S. Cl.
CPC ...... *H04L 47/6275* (2013.01); *H04L 47/6235* (2013.01); *H04L 49/109* (2013.01)

(58) Field of Classification Search
CPC ............. H04L 47/6275; H04L 47/6235; H04L 49/109
(Continued)

(56) References Cited

U.S. PATENT DOCUMENTS

2009/0260013 A1   10/2009   Heil et al.
2009/0323532 A1   12/2009   Lai
2022/0394581 A1*  12/2022   Kim .................. H04W 36/0055

FOREIGN PATENT DOCUMENTS

CN   104156264 A   11/2014
CN   108199985 A    6/2018
(Continued)

OTHER PUBLICATIONS

WIPO, International Search Report dated Feb. 4, 2021.

*Primary Examiner* — Faisal Choudhury
(74) *Attorney, Agent, or Firm* — Li & Cai Intellectual Property (USA) Office

(57) ABSTRACT

Provided in the present disclosure are a data processing method and apparatus, and an electronic device, the method includes: determining a plurality of candidate data pieces, where the candidate data pieces are provided from corresponding data sources; and determining a target data piece based on priorities of the data sources corresponding to the plurality of candidate data pieces in a current cycle, wherein a same data source has different priorities in different processing cycles, and priority sequence numbers of a same data source in different processing cycles satisfy a nonlinear relationship.

19 Claims, 7 Drawing Sheets

(58) Field of Classification Search
USPC .......................................................... 370/254
See application file for complete search history.

(56) References Cited

FOREIGN PATENT DOCUMENTS

| | | |
|---|---|---|
| CN | 109873771 A | 6/2019 |
| CN | 109995679 A | 7/2019 |
| WO | WO-2021087990 A1 * | 11/2019 |

* cited by examiner

DATA PROCESSING METHOD, DATA PROCESSING APPARATUS, ELECTRONIC DEVICE, STORAGE MEDIUM, AND PROGRAM PRODUCT

CROSS-REFERENCE TO RELATED APPLICATIONS

The present application is a National Phase Application filed under 35 U.S.C. 371 as a national stage of PCT/CN2020/134921, filed on Dec. 9, 2020, an application claiming priority from Chinese Patent Application No. 201911252471.0, filed on Dec. 9, 2019 in the Chinese Intellectual Property Office and Chinese Patent Application No. 201911252455.1, filed on Dec. 9, 2019 in the Chinese Intellectual Property Office, contents of which are hereby incorporated herein by reference in their entirety.

TECHNICAL FIELD

The present disclosure relates to the field of communication technology, and in particular relates to a data processing method, a data processing apparatus, an electronic device, a computer-readable storage medium, and a computer program product.

BACKGROUND

With the development of the artificial intelligence technology, users have increasing requirements on the chip processing capacity, and because of the limited processing capacity of a single-core chip, many-core chips are more and more widely used. In the design of the many-core chip, a network on chip (NOC) is used to implement communication between the cores, and thus, performance of the NOC is a key performance of the many-core chip. Different cores communicate with each other through data channels, and the performance of the NOC, i.e., a communication efficiency of the NOC, is improved through arbitration of the data channels.

Therefore, when implementing multi-level arbitration, how to effectively determine a data source for priority transmission among a plurality of data sources and dynamically adjust a priority order of the data are problems to be solved at present.

SUMMARY

In view of this, embodiments of the present disclosure provide a data processing method and apparatus, and an electronic device, which can be used to solve the problems of how to effectively determine a data source for priority transmission among a plurality of data sources and dynamically adjust a priority order of the data in the existing art.

According to a first aspect of the embodiments of the present disclosure, there is provided a data processing method which, in each processing cycle, includes: determining a plurality of candidate data pieces, wherein the candidate data pieces are provided from corresponding data sources; and determining a target data piece based on priorities of the data sources corresponding to the plurality of candidate data pieces in a current cycle, wherein a same data source has different priorities in different processing cycles, and priority sequence numbers of a same data source in different processing cycles satisfy a nonlinear relationship.

With the data processing method provided in the embodiments of the present disclosure, the priority sequence of a same data source varies irregularly in different processing cycles, and thus, in a plurality of successive processing cycles, the limited data output to a destination comes from a more random data sources, and the balance in the number of data sources that reach the destination is improved.

Since the priority sequence of the same data source varies irregularly in different processing cycles, the source of the data transmitted through each channel in different cycles also changes constantly so that the time delay during data transmission is more balanced.

In an embodiment, in one processing cycle, the operation of determining the target data piece based on the priorities of the data sources corresponding to the plurality of candidate data pieces in the current cycle includes: determining the number of data sources in an $N^{th}$ level arbitration, wherein N is a natural number and $1 \leq N \leq M$, and M is the total number of arbitration levels in the current processing cycle; generating codes from the number of data sources in the $N^{th}$ level arbitration in a set encoding mode; assigning all the generated codes to all data sources in the $N^{th}$ level arbitration according to a set priority order; and in each processing cycle, the operation of determining the target data piece based on the priorities of the data sources corresponding to the plurality of candidate data pieces in the current cycle includes: generating a target code for a data source corresponding to each candidate data piece according to the generated codes; arbitrating, according to the target code and a priority order corresponding to the target code, the data source corresponding to each candidate data piece to determine the target data piece; and updating, according to an arbitration result, a priority order of all data sources at each level of arbitration.

In an embodiment, the operation of generating the codes from the number of data sources in the $N^{th}$ level arbitration in the set encoding mode includes: generating the codes from the number of data sources in the $N^{th}$ level arbitration in a binary mode, wherein the number of the codes is equal to the number of data sources in the $N^{th}$ level arbitration.

In an embodiment, the plurality of data sources in the $N^{th}$ level arbitration are divided into a plurality of data source groups each including at least one data source, and wherein the operation of assigning all the generated codes to all data sources in the $N^{th}$ level arbitration according to the set priority order includes: determining, according to an order of the codes and the number of data sources in each data source group, codes corresponding to each data source group; and assigning the codes corresponding to the data source group to the data sources in the data source group one by one.

In an embodiment, the operation of generating the target code for the data source corresponding to each candidate data piece according to the generated codes includes: performing bit-to-bit swap on code bits of the code assigned to the data source corresponding to the candidate data piece to generate a swapped code; and determining the swapped code as the target code of the data source corresponding to the candidate data piece.

In an embodiment, the plurality of data sources in the $N^{th}$ level arbitration are divided into a plurality of data source groups each including at least one data source, and the method further includes: between the operation of generating the codes from the number of data sources in the $N^{th}$ level arbitration in the set encoding mode and the operation of assigning all the generated codes to all data sources in the $N^{th}$ level arbitration according to the set priority order:

performing bit-to-bit swap on code bits of each code to generate a swapped code corresponding to the code, the operation of assigning all the generated codes to all data sources in the $N^{th}$ level arbitration according to the set priority order includes: determining, according to an order of the codes, the number of data sources in each data source group, and the swapped code corresponding to each code, swapped codes corresponding to each data source group; and assigning the swapped codes corresponding to the data source group to the data sources in the data source group one by one, and the operation of generating the target code for the data source corresponding to each candidate data piece according to the generated codes includes: determining the swapped code of the data source corresponding to the candidate data piece as the target code of the data source corresponding to the candidate data piece.

In an embodiment, each data source has a corresponding physical serial number, and in a first level arbitration, every two data sources with adjacent physical serial numbers compete for usage right of one data channel, and in the operation of assigning all the generated codes to all data sources in the $N^{th}$ level arbitration according to the set priority order, priority sequence numbers of any two data sources with adjacent physical serial number are not adjacent.

In an embodiment, in the operation of arbitrating, according to the target code and the priority order corresponding to the target code, the data source corresponding to each candidate data piece to determine the target data piece, a candidate data piece corresponding to a target code of a higher priority is the target data piece, and the target data piece is a data piece for obtaining usage right of a channel; and the operation of updating, according to the arbitration result, the priority order of all data sources at each level of arbitration includes: reducing a priority of the target code of the data source corresponding to the target data piece to the last in the priority order of all data sources.

In an embodiment, each of the plurality of candidate data pieces carries an identity document (ID) configured to identify a data source of the candidate data piece; and the operation of determining the target data piece based on the priorities of the data sources corresponding to the plurality of candidate data pieces in the current cycle includes: determining a logical difference value between the ID carried by each of the plurality of candidate data pieces and a reference ID, wherein the reference ID has different values in different processing cycles; determining the priorities of the data sources corresponding to the plurality of candidate data pieces from the determined plurality of logical difference values; and taking one of the plurality of candidate data pieces corresponding to the data source with a highest priority as the target data piece.

In an embodiment, from a second processing cycle, the ID carried by the target data piece in a previous processing cycle is the reference ID of a current processing cycle.

In an embodiment, the operation of determining the priorities of the data sources corresponding to the plurality of candidate data pieces from the determined plurality of logical difference values includes: comparing the plurality of logical difference values; and determining a data source corresponding to a largest logical difference value of the plurality of logical difference values as the data source with the highest priority.

In an embodiment, the reference ID is stored in a state register unit.

In an embodiment, the reference ID in the first processing cycle has a value of 0.

In an embodiment, the operation of determining the target data piece based on the priorities of the data sources corresponding to the plurality of candidate data pieces in the current cycle further includes: before the operation of determining the logical difference value between the ID carried by each of the plurality of candidate data pieces and the reference ID, setting IDs in the plurality of candidate data pieces.

In an embodiment, the method further includes: transmitting the target data piece.

According to a second aspect of the embodiments of the present disclosure, there is provided a data processing apparatus, including: a candidate data determination unit configured to determine a plurality of candidate data pieces, wherein the candidate data pieces are provided from corresponding data sources; and a target data determination unit configured to determine a target data piece based on priorities of the data sources corresponding to the plurality of candidate data pieces in a current cycle, wherein a same data source has different priorities in different processing cycles, and priority sequence numbers of a same data source in different processing cycles satisfy a nonlinear relationship.

According to a third aspect of the embodiments of the present disclosure, there is provided an electronic device, including: a plurality of processing cores; and a network on chip configured for data interaction among the plurality of processing cores and between the cores and outside; wherein the network on chip is further configured to be capable of performing the method of the first aspect of the present disclosure; or at least one of the plurality of processing cores is configured to be capable of performing the method of the first aspect of the present disclosure.

According to a fourth aspect of the embodiments of the present disclosure, there is provided a computer-readable storage medium having computer program instructions stored thereon which, when executed by a processor, cause any method as described in the first aspect to be implemented.

According to a fifth aspect of the embodiments of the present disclosure, there is provided a computer program product which, when executed on a computer, causes the computer to implement any method as described in the first aspect.

With the data processing method provided in the embodiments of the present disclosure, the priority sequence of a same data source varies irregularly in different processing cycles, and thus, in a plurality of successive processing cycles, the limited data output to a destination comes from a more random data sources, and the balance in the number of data sources that reach the destination is improved.

Since the priority sequence of the same data source varies irregularly in different processing cycles, the source of the data transmitted through each channel in different cycles also changes constantly so that the time delay during data transmission is more balanced.

BRIEF DESCRIPTION OF DRAWINGS

The above and other objects, features and advantages of the present disclosure will become more apparent from the following description of the embodiments of the present disclosure with reference to the accompanying drawings, in which.

DETAIL DESCRIPTION OF EMBODIMENTS

The present disclosure is described below based on embodiments, but the present disclosure is not limited solely to these embodiments. In the following detailed description of the present disclosure, some specific details are set forth in detail. One skilled in the art may thoroughly understand the present disclosure even without these specific details. Well-known methods, procedures, flows, elements and circuits are not described in detail herein so as not to obscure the essence of the present disclosure.

Furthermore, those of ordinary skill in the art will appreciate that the drawings provided herein are for illustrative purposes and are not necessarily drawn to scale.

Unless the context clearly requires otherwise, throughout the description, the words "comprise", "comprising", and the like are to be construed in an inclusive sense as opposed to an exclusive or exhaustive sense; that is to say, in the sense of "including, but not limited to."

In the description of the present disclosure, it is to be understood that the terms "first", "second", and the like are used for descriptive purposes only and are not to be construed as indicating or implying relative importance. In addition, in the description of the present disclosure, "a plurality" means two or more unless otherwise specified.

Generally speaking, arbitration schemes for NOC data channels in the existing art include two cases, i.e., a fixed-priority arbitration scheme and a round-robin priority arbitration scheme, in which arbitration of the data channels refers to determine priority of data according to arbitration, and thus determining the data obtaining usage right of a data channel.

An arbitration scheme typically includes multiple levels of arbitration. As an implementation, all data to be transmitted is arbitrated in a first level arbitration. The lower the level of arbitration, the more data channels are involved, and the highest level of arbitration involves only one arbitration channel through which data can reach the destination. The arbitration scheme shown in FIG. 1 includes three levels of arbitration, i.e., a first level arbitration involving 4 data channels, channel1, channel2, channel3, and channel4; a second level arbitration involving 2 data channels, channel5 and channel6; and a third level arbitration involving 1 data channel, channel7.

Figure 2:
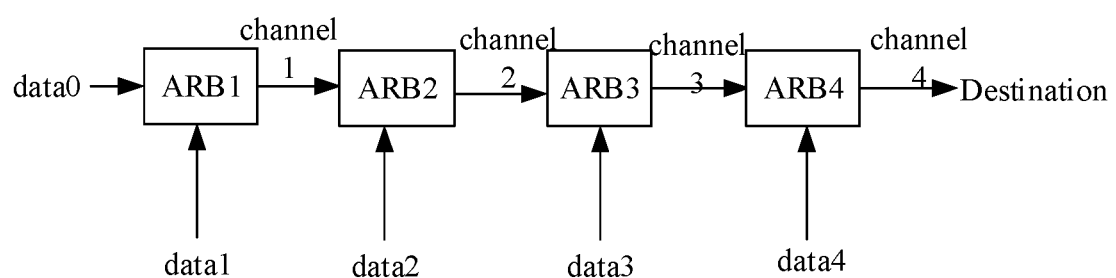
FIG. 2 is a schematic diagram of another data transmission mode in the existing art.

As another implementation, each level of arbitration involves a same number of channels, and the data participating in a next level of arbitration includes data output from data channels of a previous level and data newly input. As shown in FIG. 2, the first level arbitration involves data channel channel1, the second level arbitration involves data channel channel2, the third level arbitration involves data channel channel3, and the fourth level arbitration involves data channel channel4.

Figure 1:
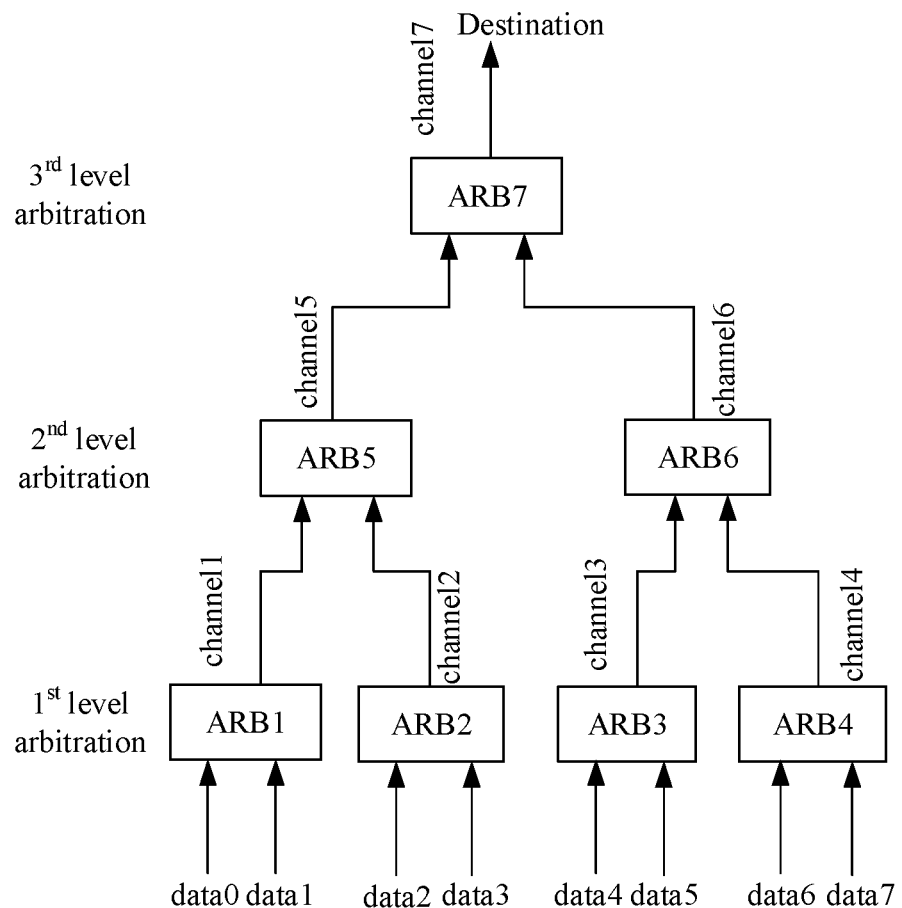
FIG. 1 is a schematic diagram of a data transmission mode in the existing art.

Either in the arbitration scheme shown in FIG. 1 or in the arbitration scheme shown in FIG. 2, both the fixed-priority arbitration scheme and the round-robin priority arbitration scheme are present.

A first case, i.e., the fixed-priority arbitration scheme, in which priorities of data sources are fixed, is suitable for arbitration with a specific priority order, but cannot implement dynamic adjustment of the priorities. For example, as shown in FIG. 1, assuming that 8 data sources are included, namely, a data0 data source, a data1 data source, a data2 data source, a data3 data source, a data4 data source, a data5 data source, a data6 data source, and a data7 data source, which are transmitted to the destination after three levels of arbitration, since the data channels are limited, more than one data pieces may compete for usage right of one data channel. For example, data0 and data1 are arbitrated by an arbiter (ARB) 1 in the first level arbitration to determine the priorities and compete for usage right of channel1; data2 and data3 are arbitrated by ARB2 in the first level arbitration to determine the priorities and compete for usage right of channel2; data4 and data5 are arbitrated by ARB3 in the first level arbitration to determine the priorities and compete for usage right of channel3; and data6 and data7 are arbitrated by ARB4 in the first level arbitration to determine the priorities and compete for usage right of channel4. Output data from channel1 and output data from channel2 are further arbitrated by ARB5 in the second level arbitration to determine the priorities and compete for usage right of channel5, that is, data competing for usage right of channel5 includes data0, data1, data2 and data3. Output data from channel3 and output data from channel4 are further arbitrated by ARB6 in the second level arbitration to determine the priorities and compete for usage right of channel6, that is, data competing for usage right of channel6 includes data4, data5, data6 and data7. Output data from channel5 and output data from channel6 are further arbitrated by ARB7 in the third level arbitration to determine the priorities and compete for usage right of channel7, that is, data competing for usage right of channel7 includes data0, data1, data2, data3, data4, data5, data6 and data7. By analogy, details will not be described in the present disclosure, until the data is transmitted to the destination. With the fixed-priority arbitration scheme, priorities of data sources corresponding to individual data pieces can be set in advance, and on the assumption that in ARB1, the priority of the data0 data source is set to be higher than that of the data1 data source, when data from the data0 data source and data from the data1 data source are simultaneously input, the data from the data0 data source obtains usage right of channel1, and the priority cannot be changed.

The first case is described below with reference to FIG. 2. As described above, since the data channels are limited, more than one data pieces may compete for usage right of one data channel. For example, data0 and data1 are arbitrated by ARB1 to determine the priorities and compete for usage right of channel1. Output data from channel1 and data2 need to be further arbitrated by ARB2 and compete for usage right of channel2. Output data from channel2 and data3 need to be further arbitrated by ARB3 and compete for usage right of channel3. By analogy, details will not be described in the present disclosure, until the data is transmitted to the destination. With the fixed-priority arbitration scheme, priorities of data sources corresponding to individual data pieces can be set in advance, and on the assumption that in ARB1, the priority of the data0 data source is set to be higher than that of the data1 data source, when data from the data0 data source and data from the data1 data source are simultaneously input, the data from the data0 data source obtains usage right of channel1, and the priority cannot be changed.

A second case, i.e., the round-robin priority arbitration scheme, can implement dynamic adjustment of the priorities of the data sources, but cannot relieve an imbalance in data transmission delay. For example, as can be seen from FIG. 1, the data sources data0 to data7 are encoded according to a code order shown in Table 1, and each data source in Table 1 has a code length of 3 bits, specifically:

TABLE 1

| Data source | Code |
|---|---|
| data0 | 000 |
| data1 | 001 |
| data2 | 010 |
| data3 | 011 |
| data4 | 100 |
| data5 | 101 |
| data6 | 110 |
| data7 | 111 |

The above Table 1 shows codes of the data sources, where an initial priority order of the data sources is data0>data1>data2>data3>data4>data5>data6>data7, that is, the corresponding code priority order is 000>001>010>011>100>101>110>111, based on which the round-robin priority arbitration is performed. Assuming that, taking the third level arbitration as an example, data input in ARB7 through channel5 may originate from data sources data0, data1, data2 and data3, and data input through channel6 may originate from data4, data5, data6 and data7, then according to the round-robin arbitration scheme, the arbitration process includes: 1. A first data arbitration: assuming that data0 and data4 compete for usage right of channel7, it is determined that data0 obtains the usage right according to the initial priority order, and due to the round-robin, the priority of data0 becomes the lowest in a next arbitration, that is, the priority order of the data sources is data1>data2>data3>data4>data5>data6>data7>data0, that is, the corresponding code priority order is 001>010>011>100>101>110>111>000; 2. A second data arbitration: assuming that data1 and data4 continue to compete for usage right of channel7, similarly, data1 obtains the usage right, and due to the round-robin, the priority of data1 becomes the lowest in a next arbitration, that is, the priority order of the data sources is data2>data3>data4>data5>data6>data7>data0>data1, that is, the corresponding code priority order is 010>011>100>101>110>111>000>001; 3. A third data arbitration: assuming that data2 and data4 continue to compete for usage right of channel7, similarly, data2 obtains the usage right, and due to the round-robin, the priority of data2 becomes the lowest in a next arbitration, that is, the priority order of the data sources is data3>data4>data5>data6>data7>data0>data1>data2, that is, the corresponding code priority order is 011>100>101>110>111>000>001>010; 4. A fourth data arbitration: assuming that data3 and data4 continue to compete for usage right of channel7, similarly, data3 obtains the usage right, and due to the round-robin, the priority of data3 becomes the lowest in a next arbitration, that is, the priority order of the data sources is data4>data5>data6>data7>data0>data1>data2>data3, that is, the corresponding code priority order is 100>101>110>111>000>001>010>011; 5. A fifth data arbitration: assuming that data0 and data4 continue to compete for usage right of channel7, similarly, data4 obtains the usage right, and due to the round-robin, the priority of data4 becomes the lowest in a next arbitration, that is, the priority order of the data sources is data5>data6>data7>data0>data1>data2>data3>data4, that is, the corresponding code priority order is 101>110>111>000>001>010>011>100; 6. A sixth data arbitration: assuming that data0 and data5 continue to compete for usage right of channel7, similarly, data5 obtains the usage right, and due to the round-robin, the priority of data5 becomes the lowest in a next arbitration, that is, the priority order of the data sources is data6>data7>data0>data1>data2>data3>data4>data5, that is, the corresponding code priority order is 110>111>000>001>010>011>100>101; 7. A seventh data arbitration: assuming that data0 and data6 continue to compete for usage right of channel7, similarly, data6 obtains the usage right, and due to the round-robin, the priority of data6 becomes the lowest in a next arbitration, that is, the priority order of the data sources is data7>data0>data1>data2>data3>data4>data5>data6, that is, the corresponding code priority order is 111>000>001>010>011>100>101>110; 8. An eighth data arbitration: assuming that data0 and data7 continue to compete for usage right of channel7, similarly, data7 obtains the usage right, and due to the round-robin, the priority of data7 becomes the lowest in a next arbitration, that is, the priority order of the data sources is data0>data1>data2>data3>data4>data5>data6>data7, that is, the corresponding code priority order is 000>001>010>011>100>101>110>111. According to the above scheme, from the first data arbitration to the fourth data arbitration, data4, data5, data6 and data7 output from channel6 are blocked in the process, and from the fifth data arbitration to the eighth data arbitration, data0, data1, data2 and data3 output from channel5 are blocked in the process, causing imbalance in data transmission delay.

In addition to causing the imbalance in data transmission delay, the second case may further result in imbalance in the number of data sources that reach the destination.

As shown in FIG. 2, during the process of transmitting data to the destination, data0 and data1 compete for usage right of channel1, and a ratio of the data competing with data0 to data0 in this competition is 1:1, data2 and output data from channel1 compete for usage right of channel2, and a ratio of the data competing with data2 to data2 in this competition is 2:1, data3 and output data from channel2 compete for usage right of channel3, and a ratio of the data competing with data3 to data3 in this competition is 3:1, data4 and output data from channel3 compete for usage right of channel4, and a ratio of the data competing with data4 to data4 in this competition is 4:1. Therefore, in the last competition, a larger proportion of data4 reaches the destination than others, causing imbalance in the number of data sources that reach the destination. Due to such imbalance, the balance of the arbitration scheme is affected, and the requirement for priority adjustment cannot be met.

In the present disclosure, the data channel may also be referred to as a transmission channel, which is not limited in the present disclosure.

The inventor of the present disclosure has found that a root cause of the imbalance in data transmission delay and the imbalance in the number of data sources reaching the destination in the round-robin priority arbitration scheme is that: although a same data source has different priority sequences in different arbitrations, the priority sequence number of the data source changes linearly (for example, the priority sequence number of a certain data source gradually increases or decreases as the number of arbitrations increases), and such linear change is too regular, which will inevitably cause non-uniform delay after multiple times of arbitration, as well as imbalance in the number of data sources reaching the destination.

Figure 3:
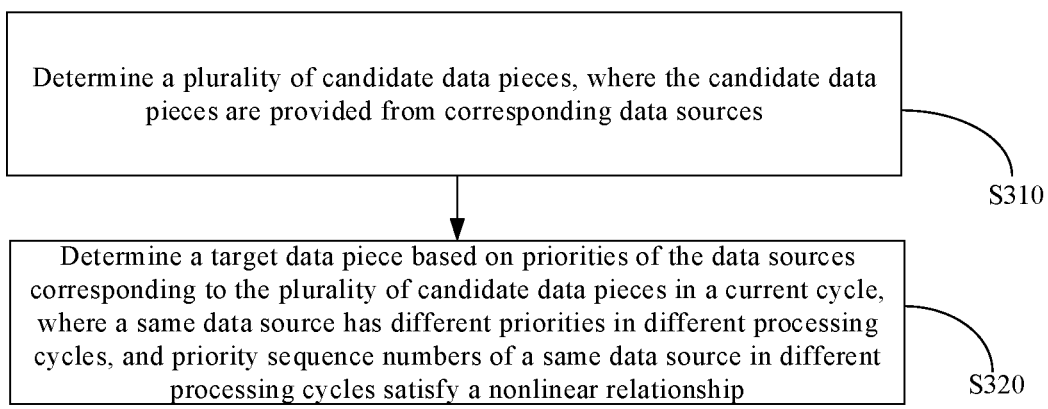
FIG. 3 is a flowchart of an implementation of a data processing method according to the present disclosure.

In view of this, as an aspect of the present disclosure, there is provided a data processing method which, as shown in FIG. 3, includes operations S310 to S320.

At operation S310, determining a plurality of candidate data pieces, where the candidate data pieces are provided from corresponding data sources.

At operation S320, determining a target data piece based on priorities of the data sources corresponding to the plurality of candidate data pieces in a current cycle, where a same data source has different priorities in different processing cycles, and priority sequence numbers of a same data source in different processing cycles satisfy a nonlinear relationship.

It should be noted that the "priority sequence number" herein refers to a serial number of a data source in a sequence of data sources arranged according to the priorities.

For example, in a first processing cycle, the priority sequence of the data sources is: data0>data1>data2>data3>data4>data5>data6>data7, then the priority sequence numbers of these 8 data sources are as shown in Table 2:

TABLE 2

| Data source | Sequence number |
| --- | --- |
| data0 | 1 |
| data1 | 2 |
| data2 | 3 |
| data3 | 4 |
| data4 | 5 |
| data5 | 6 |
| data6 | 7 |
| data7 | 8 |

For another example, in another processing cycle, the priority sequence of the data sources is: data3>data1>data0>data2>data6>data4>data5>data7, then the priority sequence numbers of these 8 data sources are as shown in Table 3:

TABLE 3

| Data source | Sequence number |
| --- | --- |
| data0 | 3 |
| data1 | 2 |
| data2 | 4 |
| data3 | 1 |
| data4 | 6 |
| data5 | 7 |
| data6 | 5 |
| data7 | 8 |

With the data processing method provided in the present disclosure, the priority sequence of a same data source varies irregularly in different processing cycles, and thus, in a plurality of successive processing cycles, the limited data output to a destination comes from a more random data sources, and the balance in the number of data sources that reach the destination is improved.

Since the priority sequence of the same data source varies irregularly in different processing cycles, the source of the data transmitted through each channel in different cycles also changes so that the time delay during data transmission is more balanced.

The following explains "priority sequence numbers of a same data source in different processing cycles satisfy a nonlinear relationship" by way of example.

Assuming that in a first processing cycle, a priority sequence number of the data0 data source is 1, then in the following 4 processing cycles, the priority sequence numbers of the data0 data source may be 8, 3, 6 and 5, respectively. It can be seen that 1, 8, 3, 6 and 5 do not satisfy an increasing or decreasing linear relationship.

As an optional implementation, for any data source, a data source with a priority sequence number 1 less than the priority sequence number of said any data source in different processing cycles is a different data source, and/or a data source with a priority sequence number 1 greater than the priority sequence number of the any data source in two adjacent processing cycles is also a different data source. The above rules are explained below by way of example.

In the first processing cycle, the priorities of the plurality of data sources are data0>data1>data2>data3>data4>data5>data6>data 7. For the data4 data source, the data source with a priority sequence number 1 less than the priority sequence number of the data4 data source is data3, and the data source with a priority sequence number 1 greater than the priority sequence number of the data4 data source is data5.

In the second processing cycle, the priorities of the plurality of data sources are data3>data1>data0>data2>data6>data4>data5>data7. For the data4 data source, the data source with a priority sequence number 1 less than the priority sequence number of the data4 data source is data6, and the data source with a priority sequence number 1 greater than the priority sequence number of the data4 data source is data5.

In the above, two data transmission modes shown in FIGS. 1 and 2 are introduced, and how to implement the data processing method of the present disclosure when data transmission is performed according to the data transmission mode shown in FIG. 1 and how to implement the data processing method of the present disclosure when data transmission is performed according to the data transmission mode shown in FIG. 2 are respectively described below.

Figure 4:
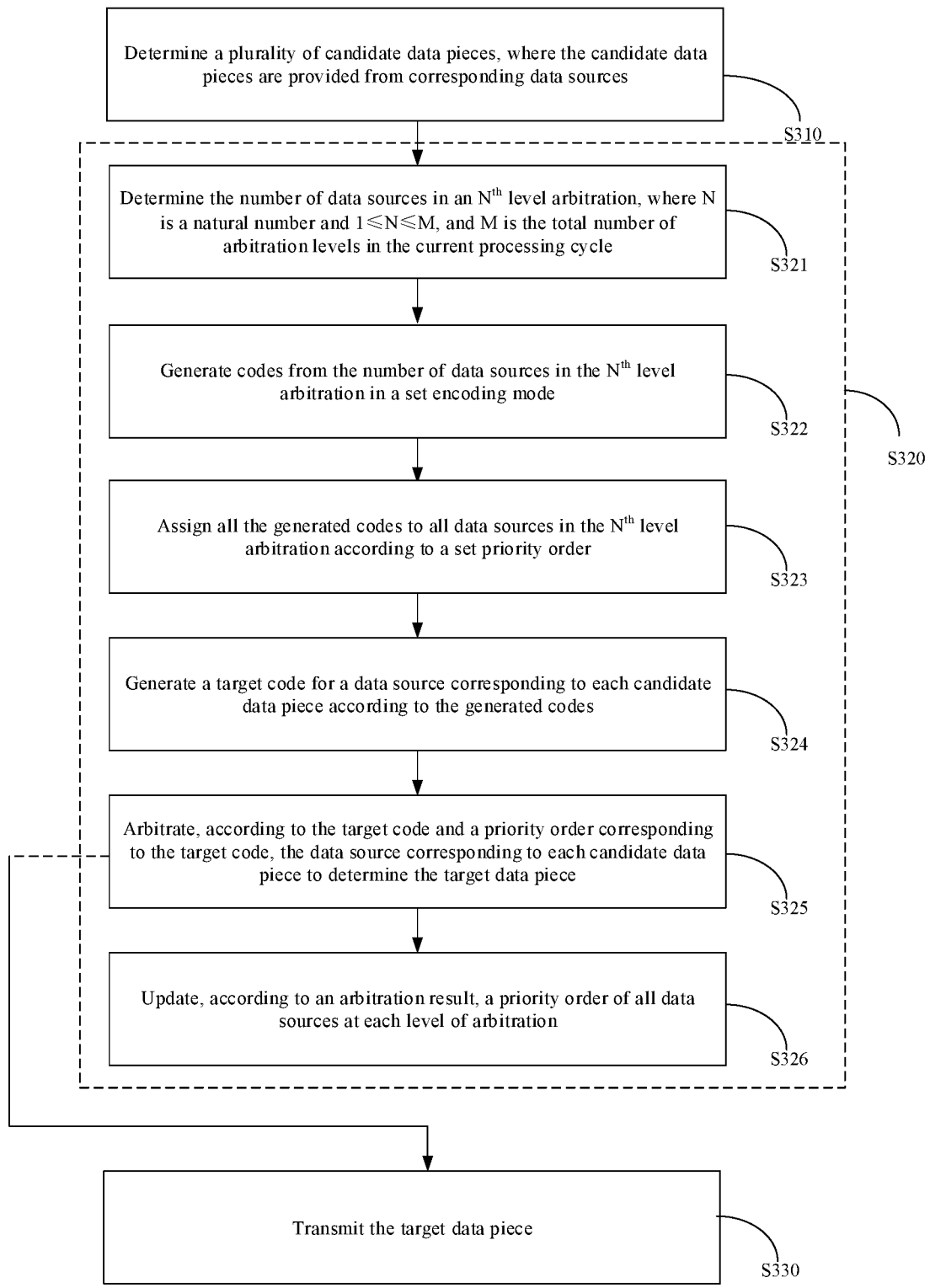
FIG. 4 is a flowchart of another implementation of a data processing method according to the present disclosure.

Based on the arbitration scheme shown in FIG. 1, as shown in FIG. 4, in one processing cycle (which may be the first processing cycle or other processing cycles), the operation S320 of the data processing method of the present disclosure may include operations S321 to S326.

At operation S321, determining the number of data sources in an $N^{th}$ level arbitration.

Optionally, each data source has a corresponding physical serial number, and in a first level arbitration, every two data sources with adjacent physical serial numbers compete for usage right of one data channel.

N is variable and may take any natural number from 1 to M. In the implementation shown in FIG. 1, M is 3.

In a possible implementation, any level of arbitration (i.e., an $N^{th}$ level arbitration) obtains data from the data sources of the two data channels, and at least 2 data sources participate in the $N^{th}$ level arbitration.

For example, as shown in FIG. 1, ARB7 of the third level arbitration acquires data from data sources corresponding to channel5 and channel6, where output data from channel5 may be data0, data1, data2 and data3, and output data from channel6 may be data4, data5, data6 and data7, that is, the third level arbitration involves 8 data sources.

Here, for each data source, the physical serial number is a fixed serial number that can be used to identify the data source. As an optional implementation, "0" in data0 is the "physical serial number" of the data0 data source, "1" in data1 is the "physical serial number" of the data1 data source, so on and so forth.

It should be noted that in the data transmission mode shown in FIG. 1, in the first level arbitration, the data0 data source and the data1 data source compete for usage right of channel1, the data2 data source and the data3 data source compete for usage right of channel2, the data4 data source and the data5 data source compete for usage right of channel3, and the data6 data source and the data7 data source compete for usage right of channel4. The physical serial number is merely used for identifying the data source, and does not limit the priority of the data source.

At operation S322, generating codes from the number of data sources in the $N^{th}$ level arbitration in a set encoding mode.

In a possible implementation, a priority order of the codes is determined according to the codes.

In a possible implementation, the codes are generated from the number of data sources in a binary mode, and the number of codes is equal to the number of data sources.

For example, in the case of 8 data sources, 3-bit binary codes may be adopted, which may include 8 binary codes, i.e., 000, 001, 010, 011, 100, 101, 110, and 111. In the case of 16 data sources, 4-bit binary codes may be adopted, which may include 0000, 0001, 0010, 0011, 0100, 0101, 0110, 0111, 1000, 1001, 1010, 1011, 1100, 1101, 1110 and 1111. In the present disclosure, as the number of data sources increases, the number of bits of each binary code also increases, which may be determined according to actual situations.

At operation S323, assigning all the generated codes to all data sources in the $N^{th}$ level arbitration according to a set priority order.

Optionally, priority sequence numbers of any two data sources with adjacent physical serial number are not adjacent.

For example, the physical serial number of the data0 data source is adjacent to the physical serial number of the data1 data source, but the priority sequence number of the data0 data source is not adjacent to the priority sequence number of the data1 data source.

In the existing art as described above, priority sequence numbers of two data sources with adjacent physical serial number are adjacent, resulting in that in the round-robin priority arbitration scheme, the priority sequence number of the same data source in different processing cycles changes linearly. In the present disclosure, since the priority sequence numbers of any two data sources with adjacent physical serial number are not adjacent, it is achieved that the priority sequence number of the same data source in different processing cycles changes non-linearly in the round-robin priority arbitration scheme.

In the present disclosure, the codes may be assigned to the data sources in the set order in two ways.

In a first way, the plurality of data sources in the $N^{th}$ level arbitration are divided into a plurality of data source groups each including at least one data source, and the operation of assigning all the generated codes to all data sources in the $N^{th}$ level arbitration according to the set order (i.e., the operation S323) may include: determining, according to an order of the codes and the number of data sources in each data source group, codes corresponding to each data source group; and assigning the codes corresponding to the data source group to the data sources in the data source group one by one.

For example, the codes are sorted from small to large according to the corresponding values, i.e., 000, 001, 010, 011, 100, 101, 110, and 111, the data sources include data0 data source, data1 data source, data2 data source, data3 data source, data4 data source, data5 data source, data6 data source, and data7 data source, in which data0, data1, data2, and data3 may be output from a channel A, data4, data5, data6, and data7 may be output from a channel B. For example, according to the channels where the data sources are output, the data sources are divided into two groups, i.e., a first group including data0, data1, data2, and data3, and a second group including data4, data5, data6, and data7. According to an order of the codes and the number of data sources in each data source group, the codes corresponding to the first group may be determined to be: 000, 001, 010, 011, and the codes corresponding to the second group may be determined to be: 100, 101, 110, 111. Then, the codes corresponding to the first group are firstly assigned to data0, data1, data2 and data3 in the first group one by one, and the codes corresponding to the second group are assigned to the data sources in the second group one by one, thereby obtaining the following Table 4:

TABLE 4

| Data source | data0 | data1 | data2 | data3 | data4 | data5 | data6 | data7 |
|---|---|---|---|---|---|---|---|---|
| Code | 000 | 001 | 010 | 011 | 100 | 101 | 110 | 111 |

It will be appreciated that when assigning the codes to the data sources in the set order, the codes may be further assigned to the data sources one by one in an order of the codes. When the $N^{th}$ level arbitration includes a plurality of (e.g., 2) data source groups, the codes may be assigned to the data sources in the first group one by one in the order of codes, for example, from small to large, and after the codes are assigned to the first group, the remaining codes may be assigned to the data sources in the second group one by one in an order from small to large. The number of data source groups, the number of data sources in each data source group, and the manner in which the codes are assigned to the data sources according to the set order, are not limited in the present disclosure.

In a second way, bit-to-bit swap may be performed on code bits of each code to generate a swapped code corresponding to the code, the operation of assigning all the generated codes to all data sources in the $N^{th}$ level arbitration according to the set order (i.e., the operation S323) may include: determining, according to an order of the codes, the number of data sources in each data source group, and the swapped code corresponding to each code, swapped codes corresponding to each data source group; and assigning the swapped codes corresponding to the data source group to the data sources in the data source group one by one, so that priority sequence numbers of any two data sources with adjacent physical serial number are not adjacent.

In a possible implementation, bit-to-bit swap is performed on code bits of the codes to generate the swapped codes. Specifically, centrosymmetric swap based on system is performed on 000, 001, 010, 011, 100, 101, 110, and 111 to generate the swapped codes, thereby obtaining the following Table 5:

TABLE 5

| Code | 000 | 001 | 010 | 011 | 100 | 101 | 110 | 111 |
|---|---|---|---|---|---|---|---|---|
| Swapped code | 000 | 100 | 010 | 110 | 001 | 101 | 011 | 111 |

In a possible implementation, as described above, the data sources are divided into two groups, i.e., the first group including data0 data source, data1 data source, data2 data source, and data3 data source, and the second group including data4 data source, data5 data source, data6 data source, and data7 data source. According to an order of the codes, the number of data sources in each data source group, and the swapped code corresponding to each code, the swapped codes corresponding to each data source group may be determined. For example, the swapped codes corresponding to the first group are determined to be: 000, 100, 010, and 110, and the swapped codes corresponding to the second group are determined to be: 001, 101, 011, and 111. The swapped codes corresponding to the first group may be assigned to data0, data1, data2 and data3 in the first group one by one, and the swapped codes corresponding to the second group may be assigned to the data sources in the second group one by one, thereby obtaining the following Table 6:

TABLE 6

| Swapped code | 000 | 100 | 010 | 110 | 001 | 101 | 011 | 111 |
|---|---|---|---|---|---|---|---|---|
| Data source | data0 | data1 | data2 | data3 | data4 | data5 | data6 | data7 |

When assigning the codes to the data sources in the set order, the swapped codes corresponding to the codes may be assigned to the data sources one by one in an order of the codes. When a plurality of (e.g., 2) data source groups are included, the swapped codes corresponding to the codes may be assigned to the data sources in the first group one by one in the order of the codes, for example, from small to large; and after the swapped codes are assigned to the first group, the swapped codes corresponding to the remaining codes may be assigned to the data sources in the second group one by one.

Figure 5:
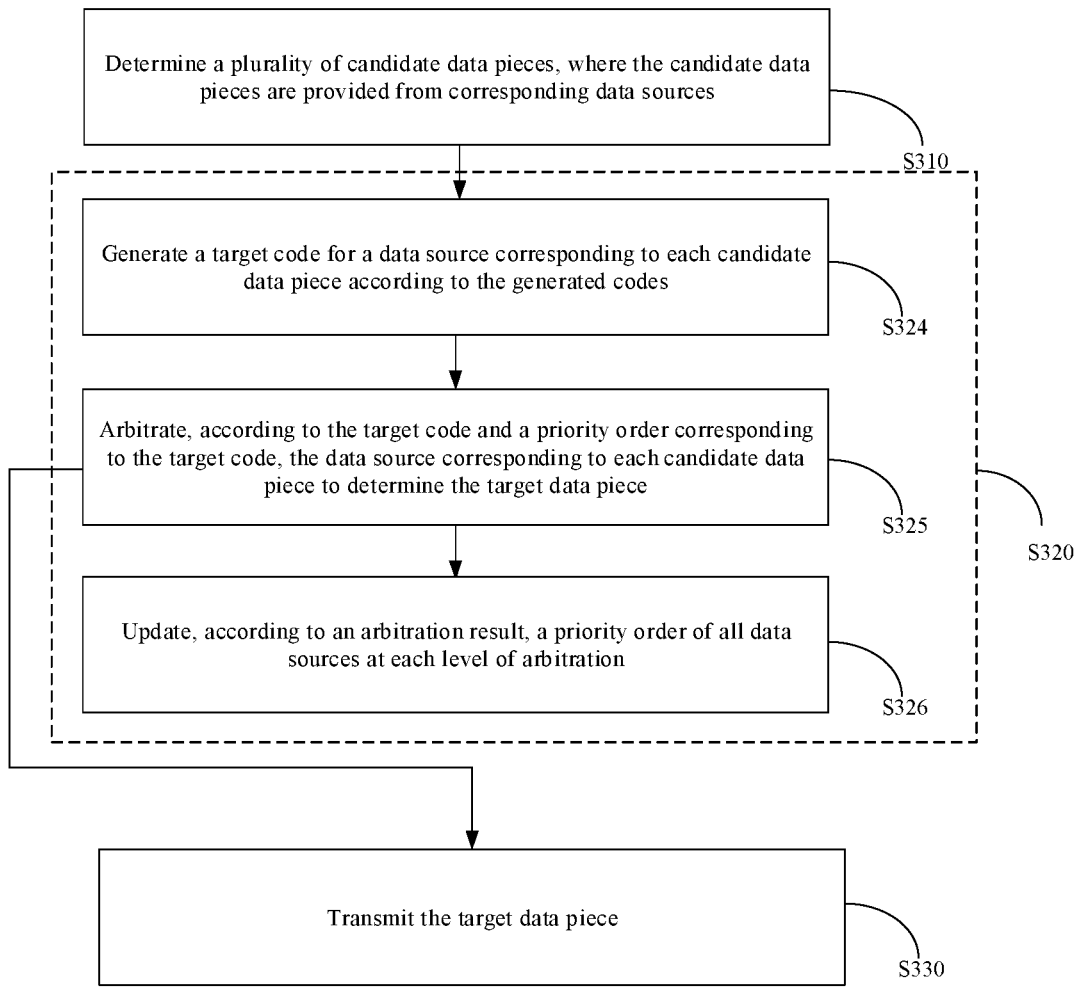
FIG. 5 is a flowchart of yet another implementation of a data processing method according to the present disclosure.

After the above operations that can be performed only in a single processing cycle, operations S324 to S326 to be performed in each processing cycle are described below with reference to FIGS. 4 and 5.

At operation S324, generating a target code for a data source corresponding to each candidate data piece according to the generated codes.

For the arbiter, more than one candidate data pieces may be arbitrated at one time. For example, in the implementation shown in FIG. 1, ARB7 may arbitrate between a candidate data piece supplied from the data0 data source and a candidate data piece supplied from the data7 data source.

In the present disclosure, corresponding to the first way for implementing the operation S323, the operation S324 may include: performing bit-to-bit swap on code bits of the code assigned to the data source corresponding to the candidate data piece to generate a swapped code; and determining the swapped code as the target code of the data source corresponding to the candidate data piece.

In a possible implementation, after 000, 001, 010, 011, 100, 101, 110 and 111 are assigned to the data sources one by one in the order of data0, data1, data2, data3, data4, data5, data6 and data7, the code bits of the codes are swapped to generate the swapped codes, thereby obtaining the following Table 7:

TABLE 7

| Data source | data0 | data1 | data2 | data3 | data4 | data5 | data6 | data7 |
|---|---|---|---|---|---|---|---|---|
| Code | 000 | 001 | 010 | 011 | 100 | 101 | 110 | 111 |
| Swapped code | 000 | 100 | 010 | 110 | 001 | 101 | 011 | 111 |

As can be seen from Table 7, the codes include: 000, 001, 010, 011, 100, 101, 110, and 111, and the swapped codes also includes: 000, 001, 010, 011, 100, 101, 110, and 111, in which some data sources have codes the same as the swapped codes, while other data sources have codes different from the swapped codes.

Corresponding to the second way for implementing the operation S323, the operation S324 may include: determining the swapped code of the data source corresponding to the candidate data piece as the target code of the data source corresponding to the candidate data piece.

In a possible implementation, the swapped codes are as shown in Table 5, and the generated swapped codes are assigned to the data sources in an order one by one to obtain the same table as Table 6.

At operation S325, arbitrating, according to the target code and a priority order corresponding to the target code, the data source corresponding to each candidate data piece to determine the target data piece.

At operation S326, updating, according to an arbitration result, a priority order of all data sources at each level of arbitration.

After operation S326, a same data source may have different priorities in different processing cycles, and priority sequence numbers of a same data source in different processing cycles satisfy a nonlinear relationship.

In a possible implementation, the priority order corresponding to the target code may be determined according to the priority order of the codes, or may also be determined according to the target code itself, such as determined according to a numerical sequence of the target code, which is not limited in the present disclosure.

In a possible implementation, the data source corresponding to the target code is arbitrated according to the target code and the priority order corresponding to the target code to determine the data source obtaining usage right of the data channel, and then a priority of the target code of the data source, which have obtained usage right of the channel, is reduced to the last in the priority order of all data sources (i.e., the priority sequence number becomes the largest).

For example, assuming that the initially set priority order is 000>001>010>011>100>101>110>111, according to the above Table 6 or Table 7, the priority order of the data sources is determined to be data0>data4>data2>data6>data1>data5>data3>data7, and assuming that the data0 data source is arbitrated with the data4 data source, the data0 data source obtains the usage right of data channel, so the priority of the data0 data source becomes the lowest in a next arbitration, and the updated priority order is data4>data2>data6>data1>data5>data3>data7>data0. By analogy, details will not be described in the present disclosure.

The data transmission process is described below through specific embodiments. Taking ARB7 arbitrating channel7 shown in FIG. 1 as an example, the respective data sources are encoded in the above order generated according to the binary mode, so that the data0 data source has a code 000, the data1 data source has a code 001, the data2 data source has a code 010, the data3 data source has a code 011, and the data source input from channel5 to ARB7 may be data0 data source, data1 data source, data2 data source, or data3 data source, and the data4 data source has a code 100, the data5 data source has a code 101, the data6 data source has a code 110, the data7 data source has a code 111, and the data source input from channel6 to ARB7 may be data4 data source, data5 data source, data6 data source, or data7 data source. Centrosymmetric swap is performed on the codes of the data sources to obtain the swapped codes thereof, in which the data0 data source has a swapped code 000, the data1 data source has a swapped code 100, the data2 data source has a swapped code 010, the data3 data source has a swapped code 110, the data4 data source has a swapped code 001, the data5 data source has a swapped code 101, the data6 data source has a swapped code 011, the data7 data source has a swapped code 111, and the initially set priority order is 000>001>010>011>100>101>110>111.

A first data arbitration (i.e., the first processing cycle) is implemented specifically as follows: assuming that the data source input from channel5 is the data0 data source (i.e., data supplied from data0 data source is a candidate data piece) with a target code 000, and assuming that the data source input from channel6 is the data4 data source (i.e., data supplied from data4 data source is a candidate data piece) with a target code 001, since in the priority order, 000>001, it is determined that the data0 data source has a priority higher than the data4 data source, and thus obtains usage right of channel7. Accordingly, in the next processing cycle, the priority of the data0 data source is reduced to the lowest, and the priority order is updated to 001>010>011>100>101>110>111>000. Then, a second data arbitration (i.e., the second processing cycle) is implemented specifically as follows: assuming that the data source input from channel5 is the data2 data source (i.e., data supplied from data2 data source is a candidate data piece) with a target code 010, and assuming that the data source input from channel6 is the data4 data source (i.e., data supplied from data4 data source is a candidate data piece) with a target code 001, since in the priority order, 001>010, it is determined that the data4 data source has a priority higher than the data2 data source, and thus obtains usage right of channel7. In the next processing cycle, the priority of the data4 data source is reduced to the lowest, and the priority order is updated to 010>011>100>101>110>111>000>001. Then, a third data arbitration (i.e., the third processing cycle) is implemented specifically as follows: assuming that the data source input from channel5 is the data2 data source (i.e., data supplied from data2 data source is a candidate data piece) with a target code 010, and assuming that the data source input from channel6 is the data6 data source (i.e., data supplied from data6 data source is a candidate data piece) with a target code 011, since in the priority order, 010>011, it is determined that the data2 data source has a priority higher than the data6 data source, and thus obtains usage right of channel7. In the next processing cycle, the priority of the data2 data source is reduced to the lowest, and the priority order is updated to 011>100>101>110>111>000>001>010. Then, a fourth data arbitration (i.e., the fourth processing cycle) is implemented specifically as follows: assuming that the data source input from channel5 is the data1 data source (i.e., data supplied from data1 data source is a candidate data piece) with a target code 100, and assuming that the data source input from channel6 is the data6 data source (i.e., data supplied from data6 data source is a candidate data piece) with a target code 011, since in the priority order, 011>100, it is determined that the data6 data source has a priority higher than the data1 data source, and thus obtains usage right of channel7. In the next processing cycle, the priority of the data6 data source is reduced to the lowest, and the priority order is updated to 100>101>110>111>000>001>010>011. Then, a fifth data arbitration (i.e., the fifth processing cycle) is implemented specifically as follows: assuming that the data source input from channel5 is the data1 data source (i.e., data supplied from data1 data source is a candidate data piece) with a target code 100, and assuming that the data source input from channel6 is the data5 data source (i.e., data supplied from data5 data source is a candidate data piece) with a target code 101, since in the priority order, 100>101, it is determined that the data1 data source has a priority higher than the data5 data source, and thus obtains usage right of channel7. In the next processing cycle, the priority of the data1 data source is reduced to the lowest, and the priority order is updated to 101>110>111>000>001>010>011>100. Then, a sixth data arbitration (i.e., the sixth processing cycle) is implemented specifically as follows: assuming that the data source input from channel5 is the data3 data source (i.e., data supplied from data3 data source is a candidate data piece) with a target code 110, and assuming that the data source input from channel6 is the data5 data source (i.e., data supplied from data5 data source is a candidate data piece) with a target code 101, since in the priority order, 101>110, it is determined that the data5 data source has a priority higher than the data3 data source, and thus obtains usage right of channel7. In the next processing cycle, the priority of the data5 data source is reduced to the lowest, and the priority order is updated to 110>111>000>001>010>011>100>101. Then, a seventh data arbitration (i.e., the seventh processing cycle) is implemented specifically as follows: assuming that the data source input from channel5 is the data3 data source (i.e., data supplied from data3 data source is a candidate data piece) with a target code 110, and assuming that the data source input from channel6 is the data7 data source (i.e., data supplied from data7 data source is a candidate data piece) with a target code 111, since in the priority order, 110>111, it is determined that the data3 data source has a priority higher than the data7 data source, and thus obtains usage right of channel7. In the next processing cycle, the priority of the data3 data source is reduced to the lowest, and the priority order is updated to 111>000>001>010>011>100>101>110. Then, an eighth data arbitration (i.e., the eighth processing cycle) is implemented specifically as follows: assuming that the data source input from channel5 is the data0 data source (i.e., data supplied from data0 data source is a candidate data piece) with a target code 000, and assuming that the data source input from channel6 is the data7 data source (i.e., data supplied from data7 data source is a candidate data piece) with a target code 111, since in the priority order, 111>000, it is determined that the data7 data source has a priority higher than the data0 data source, and thus obtains usage right of channel7. In the next processing cycle, the priority of the data7 data source is reduced to the lowest, and the priority order is updated to 000>001>010>011>100>101>110>111. In the present disclosure, the following data arbitrations are performed in the same manner as described above, and are repeated here.

Through the above solution, the data output from channel5 and the data output from channel6 obtain usage right of channel7 alternately so that the problem of imbalance in data transmission delay is solved, and as the number of data sources of channel5 and channel6 increases, the balance effect in data transmission delay becomes more obvious.

A specific implementation of the data transmission method of the present disclosure based on the scheme shown in FIG. 2 is described below. Specifically, each of the plurality of candidate data pieces carries an identity document (ID) configured to identify a data source of the candidate data piece.

In a possible implementation, assume that 2 candidate data pieces, i.e., a first data piece and a second data piece, are received, the first data piece and the second data piece each carry an ID configured to identify a data source of the first data piece and a data source of the second data piece, respectively.

In a possible implementation, assuming that the received first data piece comes from the data2 data source shown in FIG. 2, and the second data piece comes from the data1 data source output from channel1, an ID value of each data source is encoded according to a set binary encoding rule, and each data piece has a different ID value from each other. For example, the data sources are encoded according to 0 to n, where the data0 data source has an ID 000, the data1 data source has an ID 001, the data2 data source has an ID 010, the data3 data source has an ID 011, and the data4 data source has an ID 100. In a possible implementation, the number of bits of each binary code may be set according to actual situations, which is not limited in the present disclosure.

Figure 6:
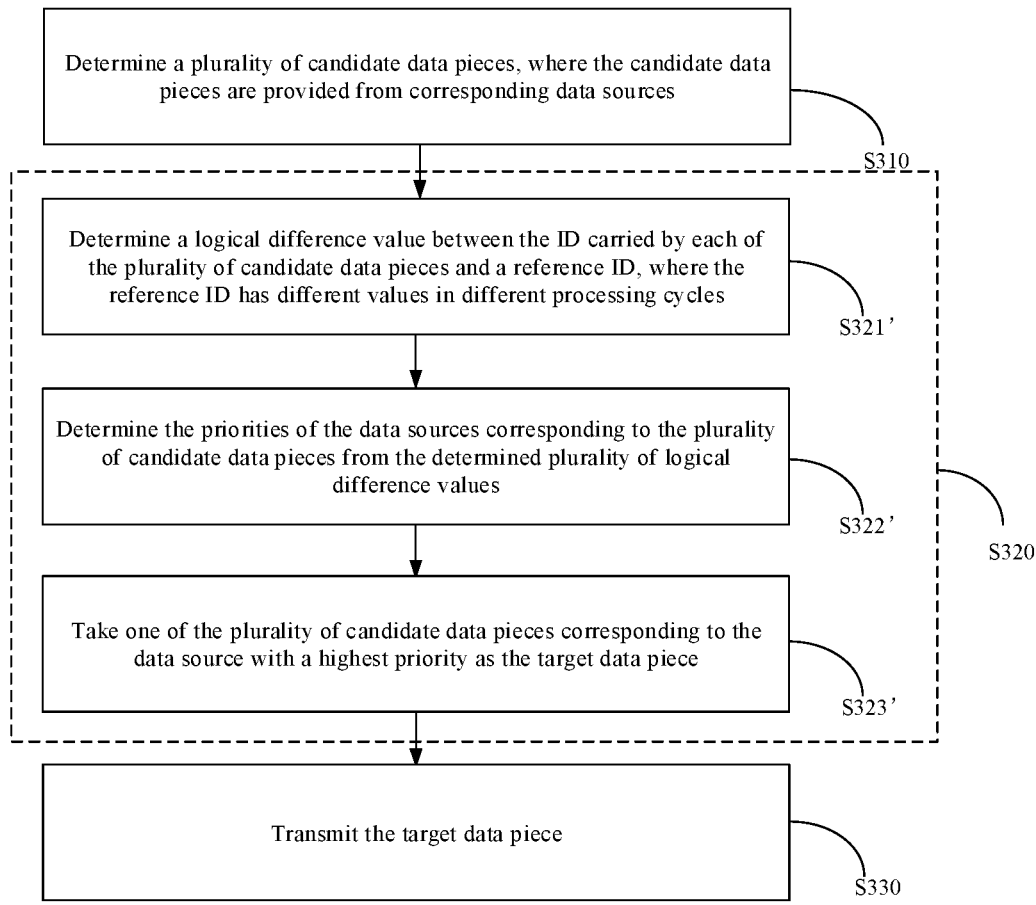
FIG. 6 is a flowchart of still another implementation of a data processing method according to the present disclosure.

In the present disclosure, as shown in FIG. 6, operation S320 may include operations S321' to S323'.

At operation S321', determining a logical difference value between the ID carried by each of the plurality of candidate data pieces and a reference ID, where the reference ID has different values in different processing cycles.

The reference ID is a value of the same system as the ID carried by each data piece. For example, when the ID of each data piece is encoded according to a binary encoding rule, the reference ID is a binary value. The logical difference value is a value determined from the reference ID and the ID carried by a data piece according to a subtraction of the system corresponding to the reference ID. For example, the logical difference value may be a value obtained by subtracting the reference ID from the ID carried by a data piece according to a binary subtraction.

In a possible implementation, the reference ID is stored in a state register unit. Taking two data pieces as an example, logical difference values between the IDs carried by the first and second data pieces and the ID of the data piece obtaining usage right of a channel in a previous arbitration are respectively determined, where the ID of the data obtaining usage right of the channel is the reference ID stored in the state register unit.

For example, assume that binary encoding is adopted, the first data piece comes from the data2 data source and carries an ID 010, the second data piece comes from the data3 data source and carries an ID 011, an ID of the data obtaining usage right of the channel in a previous arbitration is 011 (i.e., the reference ID is 011), then a logical difference value between the ID carried by the first data piece and the reference ID is 010−011=111, and a logical difference value between the ID carried by the second data piece and the reference ID is 011−011=000, where each logical difference value is a value obtained by subtraction of two binary values and calculated according to the binary subtraction.

Since the reference ID has different values in different processing cycles, a data source with a same ID in different processing cycles may correspond to different logical difference values.

At operation S322', determining the priorities of the data sources corresponding to the plurality of candidate data pieces from the determined plurality of logical difference values.

As described above, a data source with the same ID in different processing cycles may correspond to different logical difference values, which means that the data source with the same ID has different priorities in different processing cycles. As the reference ID changes, priority sequence numbers of a same data source in different processing cycles may satisfy a nonlinear relationship.

At operation S323', taking one of the plurality of candidate data pieces corresponding to the data source with a highest priority as the target data piece.

In a possible implementation, the target data piece is one of the plurality of data pieces that obtains usage right of the channel.

In a possible implementation, the operation of determining the priorities of the data sources corresponding to the plurality of candidate data pieces from the determined plurality of logical difference values (i.e., the operation S322') may include: comparing the plurality of logical difference values; and determining a data source corresponding to a largest logical difference value of the plurality of logical difference values as the data source with the highest priority.

For example, the ARB3 compares the logical difference value 001 between the ID of the first data piece and the reference ID with the logical difference value 010 between the ID of the second data piece and the reference ID, and obtains that 001<010. Therefore, the second data piece has a priority higher than the first data piece, and obtains usage right of channel4 (i.e., the data source of the second data piece has a priority higher than the data source of the first data piece). In the process of determining the largest logical difference value among the plurality of logical difference values, it is possible to directly compare the values as described above, or the plurality of logical difference values may be sorted from small to large or from large to small, to determine the largest logical difference value according to the sorting result, which is not limited in the present disclosure.

In a possible implementation, the target data piece obtains usage right of the channel, and thus can be transmitted as priority. The target data piece has a priority higher than other data pieces.

In the present disclosure, the target data piece in the plurality of data pieces may be determined according to the logical difference values, and since the logical difference value determined in each calculation is different, the determined target data piece is dynamically changed, and since each level of arbitration determines the data to be transmitted as priority, i.e., determines priorities in data transmission, through the above method, the requirement for priority adjustment can be satisfied when the data amount is unevenly distributed.

In a possible implement, from a second processing cycle, the ID carried by the target data piece in a previous processing cycle is the reference ID of a current processing cycle.

For example, ARB3 may save the ID value 011 of the data3 data source of the second data piece in the state register unit of ARB3 for a next arbitration of ARB3 (i.e., ARB3 enters a next processing cycle).

In this manner, the reference ID is determined according to the ID of the target data piece currently obtaining usage right of the channel, the updated reference ID is used for determining the target data piece that obtains usage right of the channel in a next arbitration (i.e., the next processing cycle), and the data source of the target data piece determined in each arbitration (i.e., each processing cycle) is dynamically changed, thereby implementing dynamic adjustment of the priorities of the data sources. Further, since each level of arbitration determines the data to be transmitted as priority, i.e., determines priorities in data transmission, through the above method, the requirement for priority adjustment can be satisfied when the data amount is unevenly distributed.

In a possible implementation, when the plurality of candidate data pieces include 2 candidate data pieces, the first data piece may be a data piece from the data0 data source, the data1 data source, the data2 data source, the data3 data source, or the data4 data source, and the second data piece may also be a data piece from the data0 data source, the data1 data source, the data2 data source, the data3 data source, or the data4 data source, which are not limited in the present disclosure, as long as the first data piece and the second data piece are different.

In a possible embodiment, an initial value of the state register unit is 0, that is, in the first processing cycle, the reference ID may be 0.

The data transmission process is described below through embodiments. Taking ARB3 arbitrating channel3 shown in FIG. 2 as an example, the respective data sources are encoded in the above order so that data0 and the data0 data source have an ID 000, data1 and the data1 data source have an ID 001, data2 and the data2 data source have an ID 010, data3 and the data3 data source have an ID 011. IDs of the data sources input into ARB3 from channel2 may be 000, 001, and 010, and the ID of the data3 input into ARB3 may be ID 011, and an initial value of the state register unit inside ARB3 is 000. A first data arbitration (i.e., the first processing cycle) is implemented as follows: assuming that channel2 inputs a data piece with an ID 010 and a data piece supplied from the data3 data source with an ID 011, it is determined that the logical difference value between the IDs is (010-000)<(011-000), thus the data piece supplied from the data3 data source with the ID 011 obtains usage right of channel3, and the value of the state register unit in ARB3 is updated to 011. Then, a second data arbitration (i.e., the second processing cycle) is implemented as follows: channel2 inputs a data piece with an ID 010, and the data3 data source with the data source ID 011 continues to input the data piece with the data source ID 011, since the value of the state register unit in ARB3 is updated to 011, it is determined that the logical difference value between the IDs is (010-011)> (011-011), thus the data piece supplied from the data source with the ID 010 input from channel2 obtains usage right of channel3, while the value of the state register unit in ARB3 is updated to 010. Then, a third data arbitration (i.e., the third processing cycle) is implemented as follows: assuming that channel2 inputs a data piece supplied from a data source with an ID 000, and the data3 data source supplies a data piece with an ID 011, since the value of the state register unit in ARB3 is updated to 010, it is determined that the logical difference value between the IDs is (000-010)>(011-010), thus the data piece supplied from the data source with the ID 000 input from channel2 obtains usage right of channel3, while the value of the state register unit in ARB3 is updated to 000. A fourth data arbitration (i.e., the fourth processing cycle) is implemented as follows: assuming that channel2 inputs a data piece supplied from a data source with an ID 001, and the data3 data source supplies a data piece with an ID 011, since the value of the state register unit in ARB3 is updated to 000, it is determined that the logical difference value between the IDs is (001-000)<(011-000), thus the data piece with the ID 011 supplied from the data3 data source obtains usage right of channel3, while the value of the state register unit in ARB3 is updated to 011. By analogy, details will not be described in the present disclosure.

In some implements, when the arbiter receives 3 data pieces, for example, 3 data pieces with IDs 000, 001, and 010, respectively, and the initial value of the reference ID is 000, the logical difference value between each ID and the reference ID can be determined separately, for example, the logical difference values are 000, 001, and 010, respectively. It may be determined that the maximum logical difference value is 010, and the data piece with the ID 010 obtains usage right of the transmission channel (in the current arbitration, the data piece with the ID 010 has a higher priority than the other two data pieces), thus the data piece with the ID 010 is transmitted, and the value of the reference ID is updated to 010. A plurality of data pieces, for example, 3 data pieces with IDs 000, 001 and 010 respectively, are further received, and logical difference values between these 3 data pieces and the reference ID (010) are determined, for example, to be 110, 111 and 000 respectively, where the maximum logical difference value is 111, and the data piece with the ID 001 obtains usage right of the transmission channel (in the current arbitration, the data piece with the ID 001 has a higher priority than the other two data pieces), thus the data piece with the ID 001 is transmitted, and the value of the reference ID is updated to 001. A plurality of data pieces, for example, 3 data pieces with IDs 000, 001 and 010 respectively, are further received, and logical difference values between these 3 data pieces and the reference ID (001) are determined, for example, to be 111, 000 and 001 respectively, where the maximum logical difference value is 111, and the data piece with the ID 000 obtains usage right of the transmission channel (in the current arbitration, the data piece with the ID 000 has a higher priority than the other two data pieces), thus the data piece with the ID 000 is transmitted, and the value of the reference ID is updated to 000. By analogy, details are not described here.

In this manner, dynamic adjustment of priorities of a plurality of data pieces can be implemented so that the plurality of data pieces can obtain usage right of the transmission channel in a more balanced manner.

After determining the target data piece, the method further includes operation S330.

At operation S330, transmitting the target data piece.

In the present disclosure, the arbiter may be a component module of the NOC.

Figure 7:
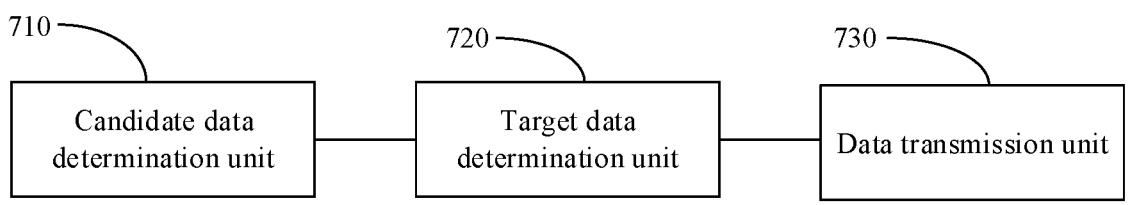
FIG. 7 is a block diagram illustrating an implementation of a data processing apparatus according to the present disclosure.

FIG. 7 is a block diagram illustrating an implementation of a data processing apparatus according to the present disclosure. As shown in FIG. 7, the data processing apparatus includes: a candidate data determination unit 710 and a target data determination unit 720.

The candidate data determination unit 710 is configured to determine a plurality of candidate data pieces, where the candidate data pieces are provided from corresponding data sources.

The target data determination unit 720 is configured to determine a target data piece based on priorities of the data sources corresponding to the plurality of candidate data pieces in a current cycle, where a same data source has different priorities in different processing cycles, and priority sequence numbers of a same data source in different processing cycles satisfy a nonlinear relationship.

The apparatus of the present disclosure is used for implementing the method of the present disclosure, and since the principle and beneficial effects of the method have been described in detail above, details are not repeated here.

Figure 8:
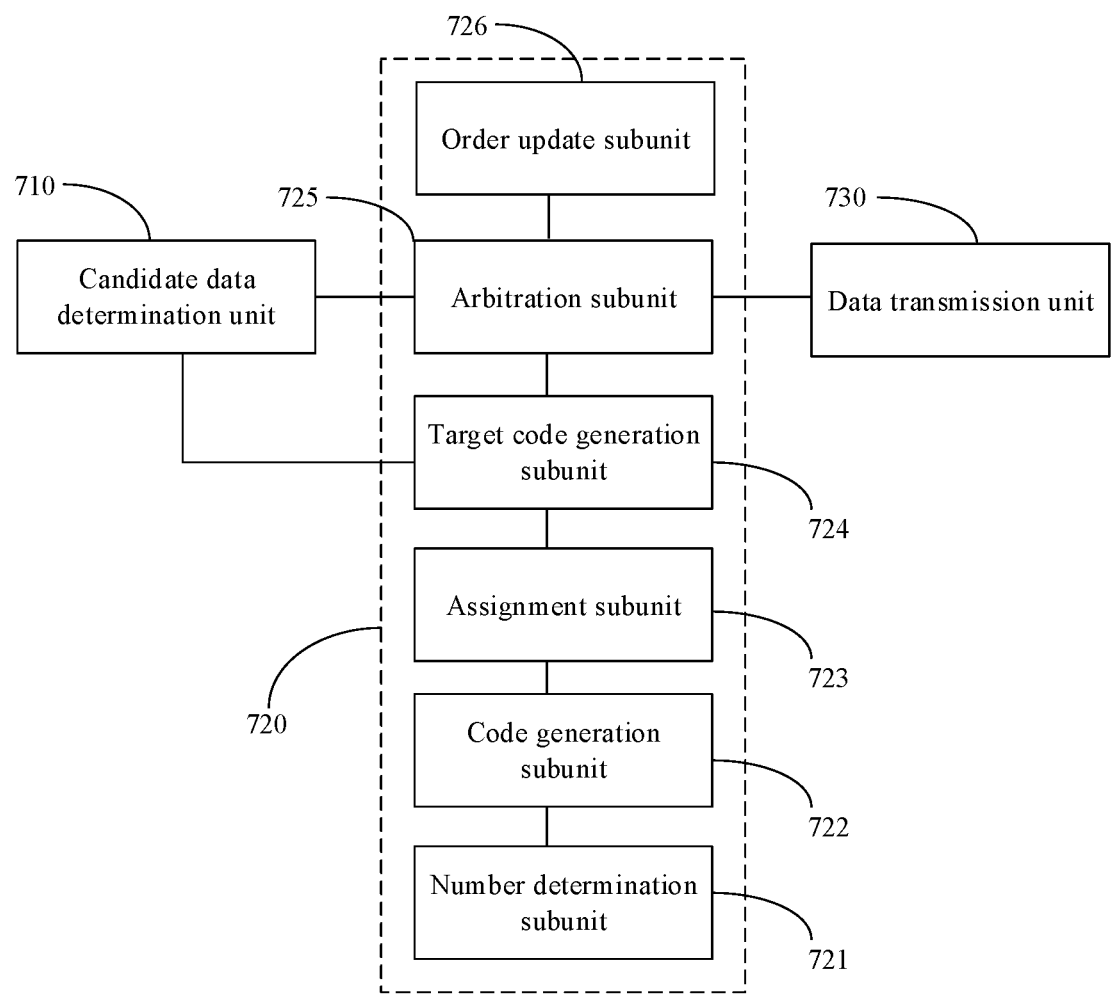
FIG. 8 is a block diagram illustrating another implementation of a data processing apparatus according to the present disclosure.

In order to implement the arbitration scheme shown in FIG. 1, optionally, as shown in FIG. 8, the target data determination unit 720 may include a number determination subunit 721, a code generation subunit 722, an assignment subunit 723, a target code generation subunit 724, an arbitration subunit 725, and an order update subunit 726.

The number determination subunit 721 is configured to determine the number of data sources in an $N^{th}$ level arbitration, where N is a natural number and 1 and M is the total number of arbitration levels in the current processing cycle.

The code generation subunit 722 is configured to generate codes from the number of data sources in the $N^{th}$ level arbitration in a set encoding mode.

The assignment subunit 723 is configured to assign all the generated codes to all data sources in the $N^{th}$ level arbitration according to a set priority order.

The target code generation subunit 724 is configured to generate a target code for a data source corresponding to each candidate data piece according to the generated codes.

The arbitration subunit 725 is configured to arbitrate, according to the target code and a priority order corresponding to the target code, the data source corresponding to each candidate data piece to determine the target data piece.

The order update subunit 726 is configured to update, according to an arbitration result, a priority order of all data sources at each level of arbitration.

Figure 9:
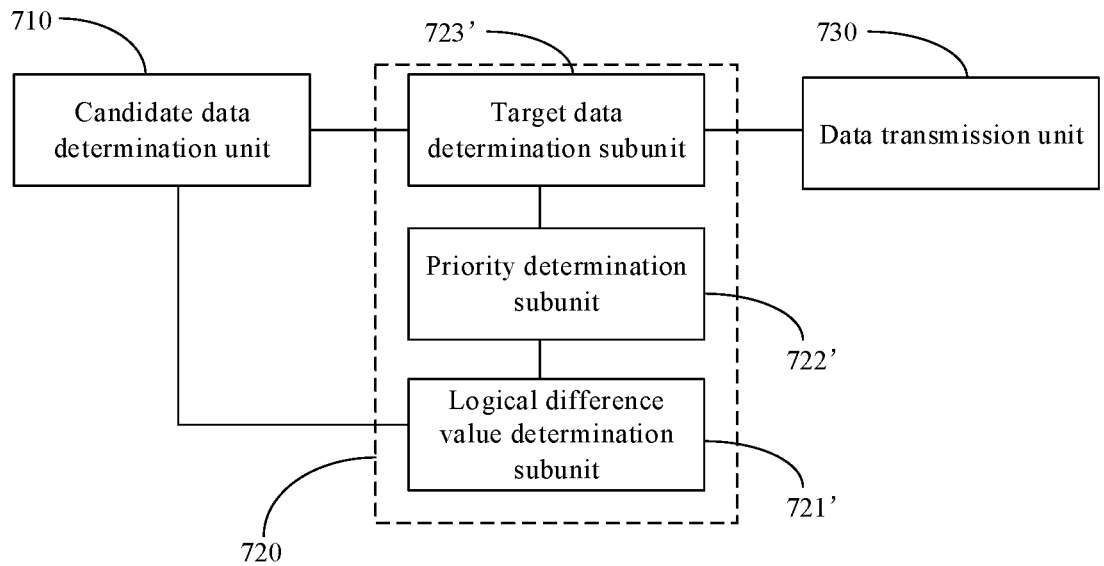
FIG. 9 is a block diagram illustrating yet another implementation of a data processing apparatus according to the present disclosure.

In order to implement the arbitration scheme shown in FIG. 2, optionally, as shown in FIG. 9, the target data determination unit 720 may include a logical difference value determination subunit 721', a priority determination subunit 722', and a target data determination subunit 723'.

The logical difference value determination subunit 721' is configured to determine a logical difference value between the ID carried by each of the plurality of candidate data pieces and a reference ID, where the reference ID has different values in different processing cycles.

The priority determination subunit 722' is configured to determine the priorities of the data sources corresponding to the plurality of candidate data pieces from the determined plurality of logical difference values.

The target data determination subunit 723' is configured to take one of the plurality of candidate data pieces corresponding to the data source with a highest priority as the target data piece.

The apparatus may further include a data transmission unit 730 configured to transmit the target data piece.

Figure 10:
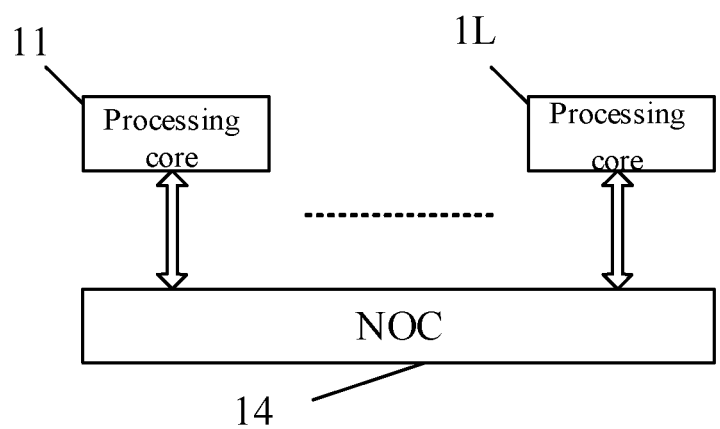
FIG. 10 is a schematic structural diagram of an electronic device according to the present disclosure.

FIG. 10 is a schematic structural diagram of an electronic device according to the present disclosure. As shown in FIG. 10, the electronic device of the present disclosure includes processing cores 11 to 1L and a network on chip 14. The processing cores 11-1L are all connected to the network on chip 14. The network on chip 14 is configured for data interaction among the L processing cores and between the cores and outside.

The electronic device of the present disclosure can implement the data processing method according to the present disclosure. However, in the present disclosure, the specific form and position for implementing the method are not particularly limited.

For example, the method may be implemented by the network on chip 14, or may be implemented by at least one of the plurality of processing cores.

The method may be implemented by software, or may be implemented by hardware.

When the method is implemented by software, instructions may be stored in the network on chip 14, and the network on chip 14 implements the method according to the instructions. When the method is implemented by hardware, corresponding hardware may be configured in the network on chip 14 to implement the method.

Apparently, when the method is implemented by software, instructions may be stored in at least one of the plurality of processing cores, and the processing core storing the instructions implements the method according to the instructions. When the method is implemented by hardware, corresponding hardware may be configured in at least one of the plurality of processing cores to implement the method.

As will be appreciated by one skilled in the art, aspects of the disclosed embodiments may be embodied in a system, a method or a computer program product. Therefore, various aspects of embodiments of the present disclosure may take the form of: an entirely hardware implementation, an entirely software implementation (including firmware, resident software, microcode, etc.) or an implementation combining software and hardware aspects that may be generally referred to herein as a "circuit," a "module" or a "system." Furthermore, various aspects of embodiments of the present disclosure may take the form of: a computer program product embodied in one or more computer-readable media having a computer-readable program code embodied thereon.

Any combination of one or more computer-readable media may be utilized. A computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium would include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of the present disclosure, a computer-readable storage medium may be any tangible medium that can contain or store a program for use by or in connection with an instruction execution system, an apparatus, or a device.

A computer-readable signal medium may include a propagated data signal with a computer-readable program code embodied therein, for example, in a baseband or as part of a carrier wave. Such a propagated signal may take any of a variety of forms, including, but not limited to: electromagnetic or optical signals, or any suitable combination thereof. The computer-readable signal medium may be any of the following computer-readable media: a computer-readable storage medium and may communicate, propagate or transmit a program for use by or in connection with an instruction execution system, an apparatus, or a device.

The program code embodied on a computer-readable medium may be transmitted using any appropriate medium, including, but not limited to, wireless, wireline, optical fiber cable, RF, and the like, or any suitable combination of the foregoing.

The computer program code for carrying out operations of various aspects of the embodiments of the present disclosure may be written in any combination of one or more programming languages, including: object-oriented programming languages such as Java, Smalltalk, C++, and the like; and conventional procedural programming languages, such as the "C" programming language, or the like. The program code may be executed entirely or partially on a user computer, as a stand-alone software package; partially on a user computer and partially on a remote computer, or entirely on a remote computer or server. In the latter case, the remote computer may be connected to the user's computer through any type of network, including a local area network (LAN) or a wide area network (WAN), or connected to an external computer (for example, through the Internet provided by an Internet service provider).

The flowchart illustrations and/or block diagrams of the method, the apparatus (system) and the computer program product according to embodiments of the present disclosure describe various aspects of embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus or other devices to operate in a particular manner such that the instructions stored in the computer-readable medium produce an article of manufacture including instructions for implementing the functions/acts specified in the in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions executed on the computer or other programmable apparatus provide processes for implementing the functions/acts specified in the flowchart and/or block diagram block or blocks.

The descriptions above are only preferred embodiments of the present disclosure, and are not intended to limit the present disclosure. For those skilled in the art, the present disclosure may have various changes and variations. Any amendments, equivalent substitutions, improvements, or the like within the principle of the present disclosure are all included in the scope of the protection defined by the appended claims of the present disclosure.

What is claimed is:

1. A data processing method which, in each processing cycle, comprises:
   determining a plurality of candidate data pieces, wherein the candidate data pieces are provided from corresponding data sources; and
   determining a target data piece based on priorities of the data sources corresponding to the plurality of candidate data pieces in a current cycle,
   wherein a same data source has different priorities in different processing cycles, and priority sequence numbers of a same data source in different processing cycles satisfy a nonlinear relationship, and
   wherein
   in one processing cycle, the operation of determining the target data piece based on the priorities of the data sources corresponding to the plurality of candidate data pieces in the current cycle comprises:
   determining the number of data sources in an $N^{th}$ level arbitration, wherein N is a natural number and $1 \leq N \leq M$, and M is the total number of arbitration levels in the current processing cycle;
   generating codes from the number of data sources in the $N^{th}$ level arbitration in a set encoding mode; and
   assigning all the generated codes to all data sources in the $N^{th}$ level arbitration according to a set priority order,
   and in each processing cycle, the operation of determining the target data piece based on the priorities of the data sources corresponding to the plurality of candidate data pieces in the current cycle further comprises:
   generating a target code for a data source corresponding to each candidate data piece according to the generated codes;
   arbitrating, according to the target code and a priority order corresponding to the target code, the data source corresponding to each candidate data piece to determine the target data piece; and
   updating, according to an arbitration result, a priority order of all data sources at each level of arbitration.

2. The method according to claim 1, wherein the operation of generating the codes from the number of data sources in the $N^{th}$ level arbitration in the set encoding mode comprises:
   generating the codes from the number of data sources in the $N^{th}$ level arbitration in a binary mode,
   wherein the number of the codes is equal to the number of data sources in the $N^{th}$ level arbitration.

3. The method according to claim 2, wherein the plurality of data sources in the $N^{th}$ level arbitration are divided into a plurality of data source groups each comprising at least one data source, and the operation of assigning all the generated codes to all data sources in the $N^{th}$ level arbitration according to the set priority order comprises:
   determining, according to an order of the codes and the number of data sources in each data source group, codes corresponding to each data source group; and
   assigning the codes corresponding to the data source group to the data sources in the data source group one by one.

4. The method according to claim 3, wherein the operation of generating the target code for the data source corresponding to each candidate data piece according to the generated codes comprises:
   performing bit-to-bit swap on code bits of the code assigned to the data source corresponding to the candidate data piece to generate a swapped code; and
   determining the swapped code as the target code of the data source corresponding to the candidate data piece.

5. The method according to claim 2, wherein the plurality of data sources in the $N^{th}$ level arbitration are divided into a plurality of data source groups each comprising at least one data source, and the method further comprises, between the operation of generating the codes from the number of data sources in the $N^{th}$ level arbitration in the set encoding mode and the operation of assigning all the generated codes to all data sources in the $N^{th}$ level arbitration according to the set priority order: performing bit-to-bit swap on code bits of each code to generate a swapped code corresponding to the code, the operation of assigning all the generated codes to all data sources in the $N^{th}$ level arbitration according to the set priority order comprises:

determining, according to an order of the codes, the number of data sources in each data source group, and the swapped code corresponding to each code, swapped codes corresponding to each data source group; and assigning the swapped codes corresponding to the data source group to the data sources in the data source group one by one, and the operation of generating the target code for the data source corresponding to each candidate data piece according to the generated codes comprises:

determining the swapped code of the data source corresponding to the candidate data piece as the target code of the data source corresponding to the candidate data piece.

6. The method according to claim 1, wherein each data source has a corresponding physical serial number, and in a first level arbitration, every two data sources with adjacent physical serial numbers compete for usage right of one data channel, and in the operation of assigning all the generated codes to all data sources in the $N^{th}$ level arbitration according to the set priority order, priority sequence numbers of any two data sources with adjacent physical serial number are not adjacent.

7. The method according to claim 1, wherein in the operation of arbitrating, according to the target code and the priority order corresponding to the target code, the data source corresponding to each candidate data piece to determine the target data piece, a candidate data piece corresponding to a target code of a higher priority is the target data piece, and the target data piece is a data piece for obtaining usage right of a channel, and the operation of updating, according to the arbitration result, the priority order of all data sources at each level of arbitration comprises:

reducing a priority of the target code of the data source corresponding to the target data piece to the last in the priority order of all data sources.

8. The method according to claim 1, further comprising: transmitting the target data piece.

9. An electronic device, comprising:
a plurality of processing cores; and
a network on chip configured to be a communication structure for data interaction among the plurality of processing cores and between the cores and outside,
wherein the network on chip or
at least one of the plurality of processing cores is configured to perform the method according to claim 1.

10. A non-transitory computer-readable storage medium having computer program instructions stored thereon which, when executed by a processor, cause the processor to perform the method according to claim 1.

11. A data processing method which, in each processing cycle, comprises:

determining a plurality of candidate data pieces, wherein the candidate data pieces are provided from corresponding data sources; and determining a target data piece based on priorities of the data sources corresponding to the plurality of candidate data pieces in a current cycle, wherein a same data source has different priorities in different processing cycles, and priority sequence numbers of a same data source in different processing cycles satisfy a nonlinear relationship, and wherein each of the plurality of candidate data pieces carries an identity document (ID) configured to identify a data source of the candidate data piece, and the operation of determining the target data piece based on the priorities of the data sources corresponding to the plurality of candidate data pieces in the current cycle comprises:

determining a logical difference value between the ID carried by each of the plurality of candidate data pieces and a reference ID, wherein the reference ID has different values in different processing cycles;

determining the priorities of the data sources corresponding to the plurality of candidate data pieces from the determined plurality of logical difference values; and taking one of the plurality of candidate data pieces corresponding to the data source with a highest priority as the target data piece.

12. The method according to claim 11, wherein from a second processing cycle, the ID carried by the target data piece in a previous processing cycle is the reference ID of a current processing cycle.

13. The method according to claim 11, wherein the operation of determining the priorities of the data sources corresponding to the plurality of candidate data pieces from the determined plurality of logical difference values comprise:

comparing the plurality of logical difference values; and
determining a data source corresponding to a largest logical difference value of the plurality of logical difference values as the data source with the highest priority.

14. The method according to claim 11, wherein the reference ID is stored in a state register unit.

15. The method according to claim 11, wherein the reference ID in the first processing cycle has a value of 0.

16. The method according to claim 11, wherein the operation of determining the target data piece based on the priorities of the data sources corresponding to the plurality of candidate data pieces in the current cycle further comprises:

before the operation of determining the logical difference value between the ID carried by each of the plurality of candidate data pieces and the reference ID, setting IDs of the plurality of candidate data pieces.

17. The method according to claim 11, further comprising:

transmitting the target data piece.

18. An electronic device, comprising:
a plurality of processing cores; and
a network on chip configured to be a communication structure for data interaction among the plurality of processing cores and between the cores and outside,
wherein the network on chip or at least one of the plurality of processing cores is configured to perform the method according to claim 11.

19. A non-transitory computer-readable storage medium having computer program instructions stored thereon which, when executed by a processor, cause the processor to perform the method according to claim 11.

* * * * *